US007371441B2

(12) United States Patent
Sakai et al.

(10) Patent No.: US 7,371,441 B2
(45) Date of Patent: May 13, 2008

(54) ARTIFICIAL STONE WALL PANEL

(75) Inventors: Mieko Sakai, Tokyo (JP); Kenichiro Saito, Kisarazu (JP)

(73) Assignee: Availus Corporation, Tokyo (JP)

( * ) Notice: Subject to any disclaimer, the term of this patent is extended or adjusted under 35 U.S.C. 154(b) by 198 days.

(21) Appl. No.: 10/521,190

(22) PCT Filed: Jul. 15, 2003

(86) PCT No.: PCT/JP03/08969

§ 371 (c)(1),
(2), (4) Date: Aug. 30, 2005

(87) PCT Pub. No.: WO2004/007391

PCT Pub. Date: Jan. 22, 2004

(65) Prior Publication Data

US 2006/0101752 A1 May 18, 2006

(30) Foreign Application Priority Data

Jul. 15, 2002 (JP) ............................ 2002-206214

(51) Int. Cl.
*B32B 3/12* (2006.01)
*B32B 5/16* (2006.01)
*B32B 27/20* (2006.01)
*C04B 14/02* (2006.01)

(52) U.S. Cl. .......................... 428/15; 428/67; 428/147; 428/403; 428/407; 52/316; 252/301.36

(58) Field of Classification Search .................. 428/15, 428/67, 402, 403, 404, 406, 407, 145, 147, 428/149, 150; 52/316, 311.1; 40/124.5, 40/800; 252/301.36
See application file for complete search history.

(56) References Cited

U.S. PATENT DOCUMENTS 6,136,226 A 10/2000 Sakai
6,309,562 B1 * 10/2001 Sakai et al. ............ 252/301.36
2003/0087074 A1 * 5/2003 Yamanashi et al. ......... 428/212

FOREIGN PATENT DOCUMENTS

| | | | |
|---|---|---|---|
| EP | 0 905 102 A1 | | 9/1999 |
| JP | 2-98406 | | 4/1990 |
| JP | 4-7458 | * | 1/1992 |
| JP | 8-267666 | | 10/1996 |

* cited by examiner

*Primary Examiner*—John J. Zimmerman
*Assistant Examiner*—Aaron Austin
(74) *Attorney, Agent, or Firm*—Wenderoth, Lind & Ponack, L.L.P.

(57) ABSTRACT

An artificial stone wall panel comprises: an artificial stone, composition of which comprises an inorganic fine powder component with a size of from 9.5 mm to 180 μm, an inorganic finely divided component with a size of less than 180 μm, and a resin component in an amount of from 7 to 30% by weight based on a total artificial stone composition, with a weight ratio of the inorganic fine powder component to the inorganic finely divided component (inorganic fine powder component:inorganic finely divided component) being in a range of from 1:1 to 5:1; and a support for installing the artificial stone onto a wall surface, embedded in the artificial stone, wherein part of the support is exposed at a back surface or edge surface of the artificial stone. This artificial stone wall panel is realized by mold-integrating an artificial stone and structure for installing such artificial stone to an external wall surface, and may be used as an external wall material with excellent design having clear contrast and natural texture.

4 Claims, 12 Drawing Sheets

F i g. 3
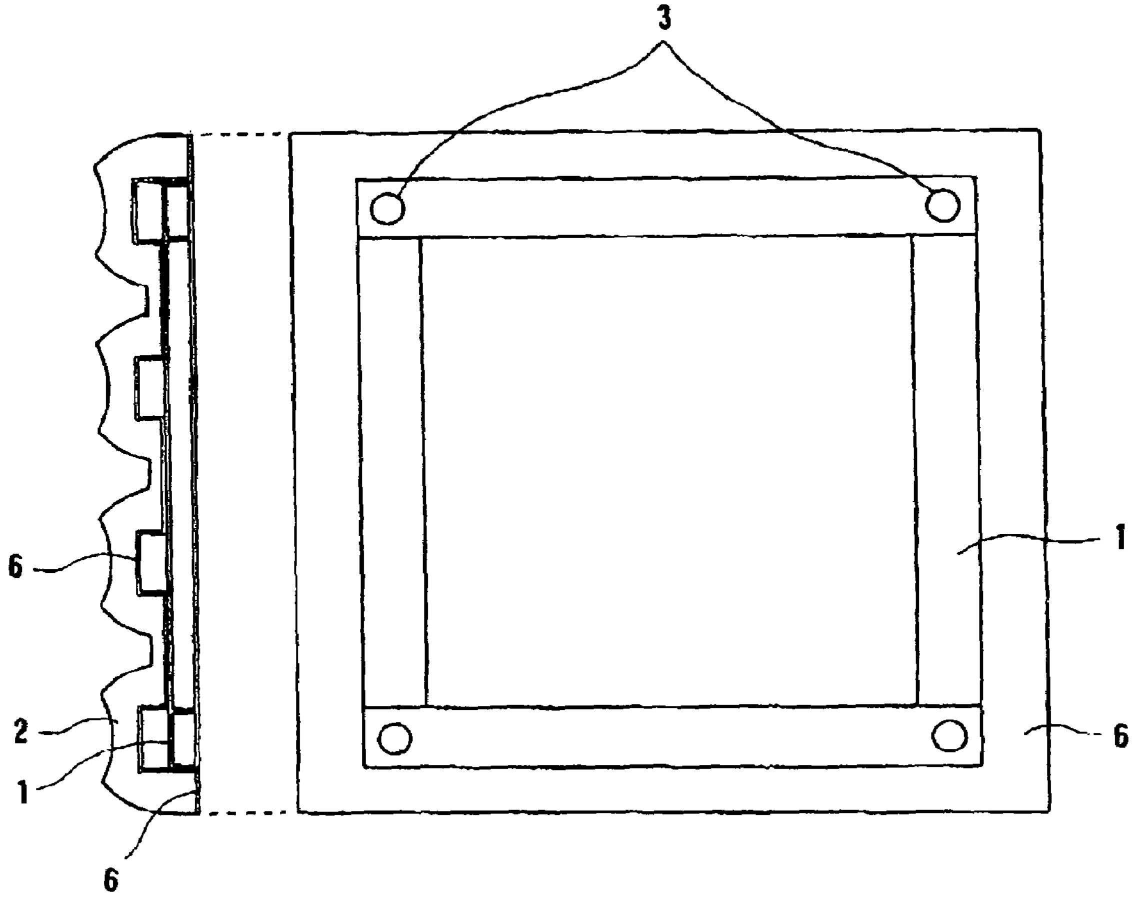

ARTIFICIAL STONE WALL PANEL

TECHNICAL FIELD

The invention of this application relates to an artificial stone wall panel and a process for producing the same. More specifically, the invention of this application relates to an artificial stone wall panel which has an excellent design, enables easy installation, and is useful as a wall finishing material for architecture and construction.

BACKGROUND ART

External walls of large structures such as buildings have been finished by directly applying a coating or tiling to a surface of a concrete body at a construction site or, as in a curtain wall, by precast-molding or connecting a concrete body and a finishing material at a factory and fabricating at the construction site.

On the other hand, for an external wall of a structure such as a house, large panels, such as siding boards subjected to premolding and precoating to form an irregular external surface, fixed on a stud or a base panel made of wood or steel, has been generally widespread.

For example, in case of ceramic siding boards which are most frequently used as external wall materials of houses, the boards are generally installed by adhering or connecting through post treatment engagement fittings on a wall of the house through a stud or a base panel made of wood or steel.

Although use of such siding boards improves a design of external walls and allows a variety in terms of selection of design, adhesion or connection of the engagement fittings through post treatment and installation of the boards onto a surface of an external wall were laborious and costly, and were great restriction factors in terms of construction and cost.

Thus, mold-integrating of the engagement fittings during molding of the siding boards has been studied. However, ordinary cement or ceramic sidings have been problematic in that, in such mold-integrating, warpage and cracks could not be avoided during cure shrinkage of these products.

Meanwhile, in some ALC panels and precast concrete panels having a thickness of more than 50 mm, an example of mold-integrating and embedding by first welding and fixing an engagement fitting to reinforcement steel and then pouring ready-mixed concrete, is known. Here, the reinforcement steel and fittings to be embedded are located on a surface and a back at a nearly central position, or a nearly symmetrical position from a center of a cured product, to prevent warpage and cracks by cure shrinkage. However, such ALC panels and pre-cast concrete panels have an artificial appearance with little natural texture, and are also heavy in terms of weight. Also, a shape and position of the fittings were characteristically restricted.

Under these circumstances, as a product that can realize designs with a more natural texture, an artificial stone, which is a molded product of a mixture of resin, natural stone and mineral, has attracted much attention, and attempts have been made to mold-integrate engagement fittings on such an artificial stone. For example, JP-A-6-106549 proposes a method in which a fitting for engagement is held from both a surface and back by mold-laminating with a molten material obtained by kneading a thermosetting resin and a stone powder. Balance of cure shrinkage of the surface and the back is attempted to suppress warpage. Nevertheless, in this case, only a simple mold-lamination process is attempted, and this molding method is limited. Further, because a relationship between composition of a molded product and integration with a fitting has not been taken into consideration, occurrence of warpage and cracks following integration is not satisfactorily suppressed. Moreover, design properties and physical properties such as strength for using this artificial stone as an external wall material is not actually taken into consideration.

Consequently, an object of the invention of this application is to provide, upon solving the foregoing problems associated with the prior art, a novel artificial stone wall panel as an external wall material with excellent design, while also simplifying installation to an external wall, thereby being advantageous in view of productivity, workability and cost, by mold-integrating an artificial stone and structure for installing such artificial stone to an external wall surface. An object of the invention of this application is also to provide a process for producing the artificial stone wall panel.

SUMMARY OF THE INVENTION

For solving the foregoing problems, the invention of this application first provides an artificial stone wall panel comprising: an artificial stone, composition of which comprises an inorganic fine powder component with a size of from 9.5 mm to 180 μm, an inorganic finely divided component with a size of less than 180 μm, and a resin component in an amount of from 7 to 30% by weight based on a total artificial stone composition, with a weight ratio of the inorganic fine powder component to the inorganic finely divided component (inorganic fine powder component:inorganic finely divided component) being in a range of from 1:1 to 5:1; and a support for installing the artificial stone on a wall surface, embedded in the artificial stone, wherein part of the support is exposed at a back surface or edge surface of the artificial stone.

The invention of this application secondly provides an artificial stone wall panel, wherein the artificial stone composition has a cure shrinkage factor of at most 0.3%, thirdly provides an artificial stone wall panel, wherein the artificial stone composition has a density in a range of from 2.0 to 2.8 g/cm$^3$ after curing, fourthly provides an artificial stone wall panel, wherein the support is embedded at a volume ratio of at most 80% with a depth of at most 80% of a total thickness, and fifthly provides an artificial stone wall panel, wherein the support is a metal fitting.

The invention of this application sixthly provides any one of the above artificial stone wall panels, wherein at least 5% by weight of the inorganic fine powder component is a transparent inorganic component, and seventhly provides an artificial stone wall panel, wherein a surface has an asperity with a depth (height) of from 1 to 100 mm.

Further, the invention of this application eighthly provides a process for producing an artificial stone wall panel, which comprises: preparing a mixture having a composition comprising an inorganic fine powder component with a size of from 9.5 mm to 180 μm, an inorganic finely divided component with a size of less than 180 μm and a resin component in an amount of from 7 to 30% by weight based on a total composition, with a weight ratio of the inorganic fine powder component to the inorganic finely divided component (inorganic fine powder component:inorganic finely divided component) being in a range of from 1:1 to 5:1; and filling the mixture into a bottom mold; press-molding a support for installing the artificial stone on a wall surface along with a top mold, thereby mold-integrating and embedding the support in a way such that part of the support is exposed at either a back surface or an edge surface of the artificial stone wall panel. The invention ninthly provides a process for producing an artificial stone wall panel, wherein the press-molding is performed under a pressure of from 1 $N/cm^2$ to 100 $N/cm^2$, and tenthly provides a process for producing an artificial stone wall panel, wherein the resin component is filled in the form of a mixture of at least two of the following: a monomer, an oligomer or a polymer.

In the invention of this application, as described above, on basis of findings that in mold-integrating of the support for installation on the wall surface with the artificial stone, it is indispensable to properly control composition of the resin material and the inorganic components to be mixed therewith for suppressing influence accompanied by cure shrinkage of the resin component and that in this control of the composition, aggregates as the inorganic components are stretched with each other in a densely packed state to suppress shrinkage and the resin component as a binder forms a compact cured texture, a construction of peculiar requirements therefore has been introduced. That is, in the invention of this application, it is indispensable that a combination of the inorganic fine powder component with the size of from 9.5 mm to 180 μm and the inorganic finely divided component with the size of less than 180 μm is in the range of from 1:1 to 5:1 in terms of a weight ratio, and further that the amount of the resin component is in the range of from 7 to 30% by weight based on the total amount of the artificial stone body exclusive of an amount of the support.

In the production process, it is indispensable that the mixture of the resin component and the inorganic components is filled into the lower mold, the support for installation onto a wall surface is pressed along with the upper mold to integrate the support by embedding so as to expose part of the support to at least one of the back surface and the edge surface of the artificial stone wall panel.

In the invention of this application, it is possible to solve problems of the prior art, realize an external material excellent in terms of designing property with a natural texture by an artificial stone, maintain a predetermined strength for installation, and simplify preparation and work for installation onto an exterior wall surface.

BRIEF DESCRIPTION OF DRAWINGS

FIGS. 3 and 4 are sectional views and a back surface view showing an example of mold-integrating of a combination of a steel frame and an irregularly finished steel plate.

DETAILED DESCRIPTION OF THE PREFERRED EMBODIMENTS

Figure 1:
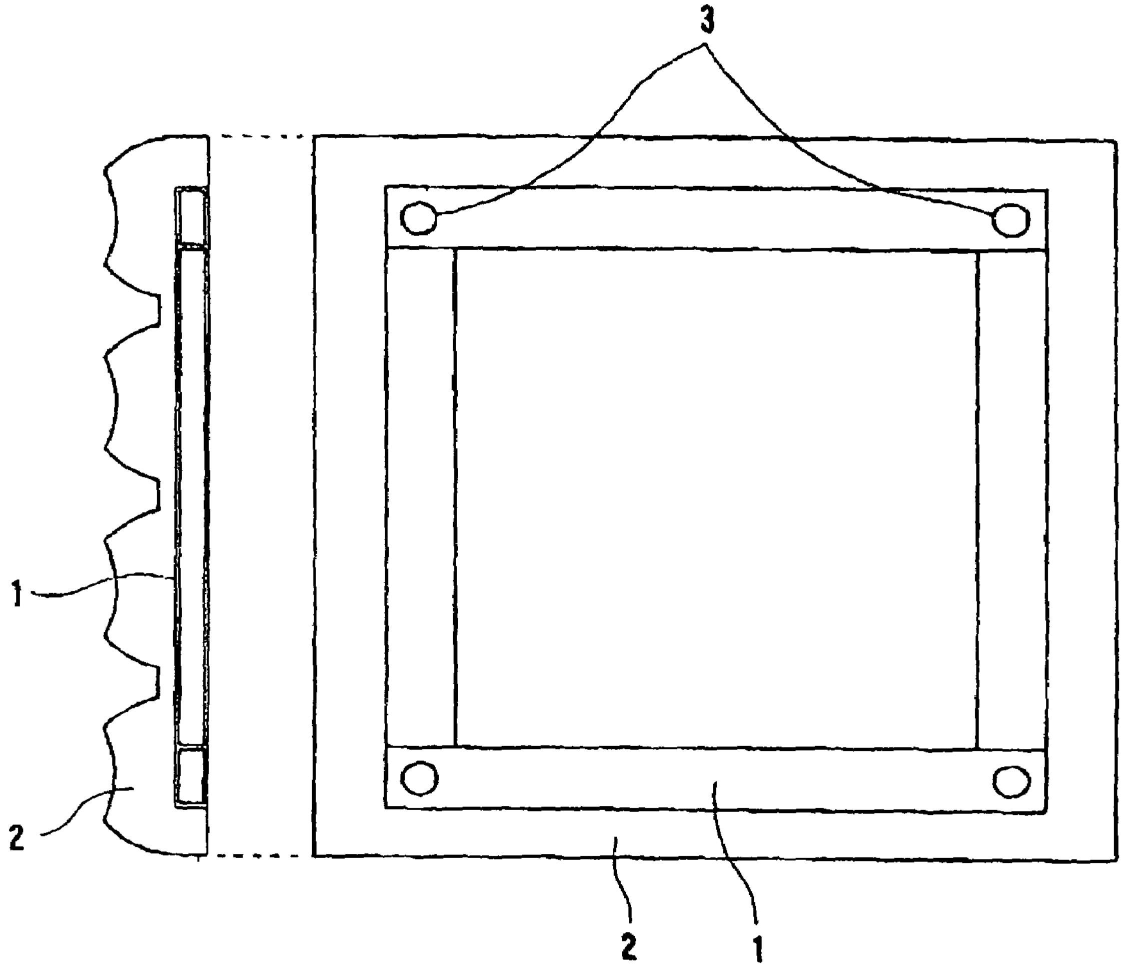
FIGS. 1 and 2 are sectional views and a back surface view showing an example of mold-integrating of a steel frame.

The invention of this application has foregoing characteristics, and embodiments thereof are described below.

In an artificial stone wall panel of the invention of this application, it is indispensable, as stated above, that composition of an artificial stone body except a support comprises <I-1> an inorganic fine powder component with a size of from 180 μm to 9.5 mm, <I-2> an inorganic finely divided component with a size of less than 180 μm, and <II> a resin component, with an amount of the resin component <II> being in a range of from 7 to 30% by weight based on a total amount, and a weight ratio of inorganic components being in the range of <I-1>:<I-2>=1:1 to 5:1.

The inorganic fine powder component <I-1> and the inorganic finely divided component <I-2> as the inorganic aggregates constituting an artificial stone wall material in combination with the resin component <II> effectively suppress occurrence of warpage or cracks in mold-integrating with the support, and further realize desired physical properties such as strength and hardness. At this time, in realizing the physical properties, it is important to blend these two types of the inorganic components <I-1> and <I-2> different in grain size. This is because with use of the inorganic components <I-1> and <I-2> different in grain size, a high-density artificial stone wall panel body with a highest fillability by classification is realized. This results in providing, in consideration of a blending amount of the resin component <II>, an artificial stone wall panel having a natural appearance like natural stone, which panel cannot be estimated, at a glance, to be a resin molded product.

With respect to blending amounts, it is preferable that a total amount of the inorganic components <I-1> and <I-2> is less than 93% by weight and an amount of the resin component <II> is at least 7% by weight and at most 30% by weight, for example, from 7 to 20% by weight. When the amount of the resin component exceeds 30% by weight, it is difficult to control cure shrinkage to less than 0.3% even during molding with a great pressure exceeding, for example, 50 $N/cm^2$, and warpage or cracks might occur.

In the invention of this application, concerning the inorganic components <I-1> and <I-2>, as described above, an amount of the inorganic fine powder component <I-1> with the larger grain size is larger. It is important that in the weight ratio, the amount thereof is from 1 to 5 times that of the inorganic finely divided component <I-2>. When it is less than 1 time, an effect of suppressing cure shrinkage by stretching of the inorganic fine powder component <I-1> is not sufficient. When it exceeds 5 times, it is difficult to provide a high density, which results in decreasing properties as an artificial stone member, such as a bending strength. Accordingly, these cases are undesirable.

In the artificial stone wall panel of the invention of this application, it is considered that a cure shrinkage factor of the artificial stone body, except for the support, is at most 0.3%, more preferably at most 0.1%. Incidentally, regarding a definition of "cure shrinkage factor" in the invention of this application, a cure shrinkage factor S is represented by the following Formula 1, wherein A represents a horizontal inner size (in withdrawal from molds) of a mold frame and B represents a horizontal size (measured at room temperature (20° C.)) of a cured product during molding with the mold frame.

$$S(\%) = \frac{A - B}{A} \times 100 \quad \text{[Formula 1]}$$

In this case, size B of the cured product is naturally a size of the artificial stone body before the support is embedded by molding.

In the invention of this application, it is preferable that a density (after curing) of the artificial stone body is in a range of from 2.0 to 2.8 g/cm$^3$.

With respect to the inorganic fine powder component <I-1> in the foregoing blending amount, at least 5% by weight thereof can be a transparent component as noted above. In this blending, an artificial stone wall panel releasing scattered luminescence that is variable by illumination of natural light or artificial light and its movement, namely by changing an angle or intensity of illumination, is realized. This effect is actually brought forth by providing asperity having a depth (height) of from 1 to 100 mm on a surface.

In the foregoing case, a total amount of the inorganic fine powder component may be a transparent component. An amount of the transparent component based on the total amount of the inorganic fine powder component <I-1> is generally from 5 to 95% by weight, preferably from 10 to 70% by weight.

Types of the inorganic components <I-1> and <I-2> may include various types. At least one of a natural stone powder, a mineral powder, a ceramic powder, a glass powder and a metallic or alloy powder are available. The inorganic fine powder component <I-1> may contain a transparent inorganic fine powder component. As the transparent inorganic fine powder component, at least one of colorless transparent and colored transparent components of quarts, glass, garnet, amethyst and the like are preferably used. As the inorganic fine powder component other than these transparent inorganic fine powder components, for example, natural stones such as granite and marble, molded articles such as a tile which are crushed and classified, or sands such as river sand and sea sand which are classified, are listed. With respect to advantages of combined use of river sand, sea sand or dam sedimentary sand, it is considered that these sands are energy-saving materials without need of crushing, a fluidity of a mixture before solidification is good because a round corner of a grain, and a natural texture is induced.

Further, as another inorganic fine powder component, a fine powder component to which a luminous or fluorescent pigment is coated on its surface by baking or by coating, as a coating layer with a resin, may be used. A characteristic luminescence or fluorescence is realized more effectively by blending these coated products in an amount of at least 5% by weight based on the total amount.

Such a luminous or fluorescent pigment may be contained as at least a part of the inorganic finely divided component <I-2>.

The resin component <II> as a component constituting an artificial stone wall pane body in the invention of this application may be made of various polymers or copolymers of addition-polymerization, condensation-polymerization or the like, and may be selected upon considering strength, weatherability, water resistance, oil resistance and the like, as a wall material in relation to use as wall material. In general, preferable examples thereof include polymers of methyl methacrylate, butyl methacrylate and the like, methacrylic resins as copolymers containing these as a main component, polymers of methyl acrylate, ethyl acrylate, butyl acrylate, acrylic acid and the like, acrylic resins as copolymers containing these as a main component, unsaturated polyester resins, epoxy resins, styrene resins, and composite resins of more than one thereof.

In the artificial stone wall material of the invention of this application, an artificial stone recycle material may be used to supplement at least one of the foregoing <I-1>, <I-2> and <II>. This recycle material may be derived from building materials such as scrap wood and wood for furniture, materials of construction for road or the like, materials produced for disaster prevention or the like, and materials discharged during production. This recycle material is used such that an artificial stone formed by blending the inorganic fine powder component with a size of from 180 μm to 9.5 mm, the inorganic finely divided component with a size of less than 180 μm and the resin component, molding these blended materials, and solidifying this molded product, is crushed to a size of from 180 μm to 9.5 mm. These recycle materials are used as at least a part of the inorganic fine powder component <I-1>.

Accordingly, resources are conserved, and costs are reduced.

In this case, when artificial stone crushed to a size of from 180 μm to 9.5 mm is blended with a transparent grain component, a luminous material or a fluorescent material, a good luminous performance is expected.

Size of the inorganic component in the foregoing description is from 180 μm to 9.5 mm in the grain and less than 180 μm in the fine grain. This can actually be attained easily by using, for example, a sieve of a nominal mesh defined in JIS Z 8801-1:2000 corresponding to ISO. The grain component with the size of from 180 μm to 9.5 mm can be classified as a component which is passed through a 9.5 mm-mesh sieve and remains on a 180 μm-mesh sieve. The fine grain component can be classified as a component which is passed through a 180 μm-mesh sieve.

In the artificial stone wall panel of the invention of this application, along with blending characteristics, it is possible that asperity of from 1 to 100 mm is formed on a surface and at least a part of the transparent inorganic fine powder component is exposed to the surface. That a size of the asperity on the surface is in the range of from 1 to 100 mm is effective for releasing scattered luminescence that is variable by illumination of natural light or artificial light and movement thereof. A size of less than 1 mm is not necessarily satisfactory for releasing variable scattered luminescence. A size exceeding 100 mm makes a wall finish member too thick, raises cost and increases restrictions to structures. Thus, luminescence is rather impaired. Meanwhile, exposure of the transparent inorganic fine powder component is also indispensable. This exposure is realized more effectively by making the amount of the transparent component at least 5% by weight based on the total amount of the inorganic fine powder component <I-1> as stated above. When it is less than 5% by weight, exposure of the transparent inorganic fine powder component to the surface is not satisfactory, and it is hardly expected to release variable scattered luminescence.

A method of applying asperity to the surface and exposing the transparent inorganic fine powder component thereto may include various methods. As a preferable method, for example, the resin component on the surface is effectively removed with a solvent capable of dissolving the resin component on the surface or by jetting pressure water of a water jet on the surface, after heat-molding under pressure through casting with a reverse decorating die.

By these methods, the artificial stone wall panel releases scattered luminescence that is variable by illumination of natural light or artificial light and movement thereof. Such an artificial stone wall panel has been so far completely unknown. By arrangement of such artificial stone wall panels, a desired glossy wall surface in combination with a less glossy or glossless wall surface can freely be designed easily.

In the invention of this application, the support for installation on the wall surface is integrally molded by being embedded in at least one of a back surface and an edge surface of a molded product as the artificial stone body.

In the artificial stone panel, at least a part of the support is exposed to at least one of a back surface and an edge surface of the panel or both thereof, whereby installation on a wall surface is enabled.

Material of the support may include various materials such as a metal (including an alloy), a resin, a woody material, a ceramic and a composite material of at least two of these materials. Preferable is a material which is good in affinity for the foregoing artificial stone body texture and in adhesion thereto and excellent in terms of weatherability, water resistance, strength, durability and the like. Its shape and structure may include various types. For example, it is considered that an engagement portion which allows screwing, bolting, nailing, riveting or the like and which can fix the panel from the back surface without boring or cutting a panel surface is formed, or that a structure having a fixing portion protruded outside an edge surface is provided.

The support can be produced by being integrally molded with the artificial stone panel body. At this time, a mixture of the foregoing composition for the panel body is filled in a lower mold, and the support and an upper mold are then pressed for mold-integrating.

During this molding, a pressure of, for example, at most 100 $N/cm^2$ is sufficient, and the pressure may actually be from 10 $N/cm^2$ to 30 $N/cm^2$. In consideration of fillability in the lower mold or moldability, it is preferable that at least two of a monomer, oligomer and polymer are used as the resin component in the mixture.

During embedding of the support by molding, it is generally preferable that a volume ratio, except a portion protruded outside the artificial stone panel, is at most 80% and a depth is at most 80% of a total thickness. When the volume ratio exceeds 80% and the depth exceeds 80%, characteristics as the wall panel, such as a strength, tend to be impaired, and appearance of a surface lacks uniformity.

Figure 2:
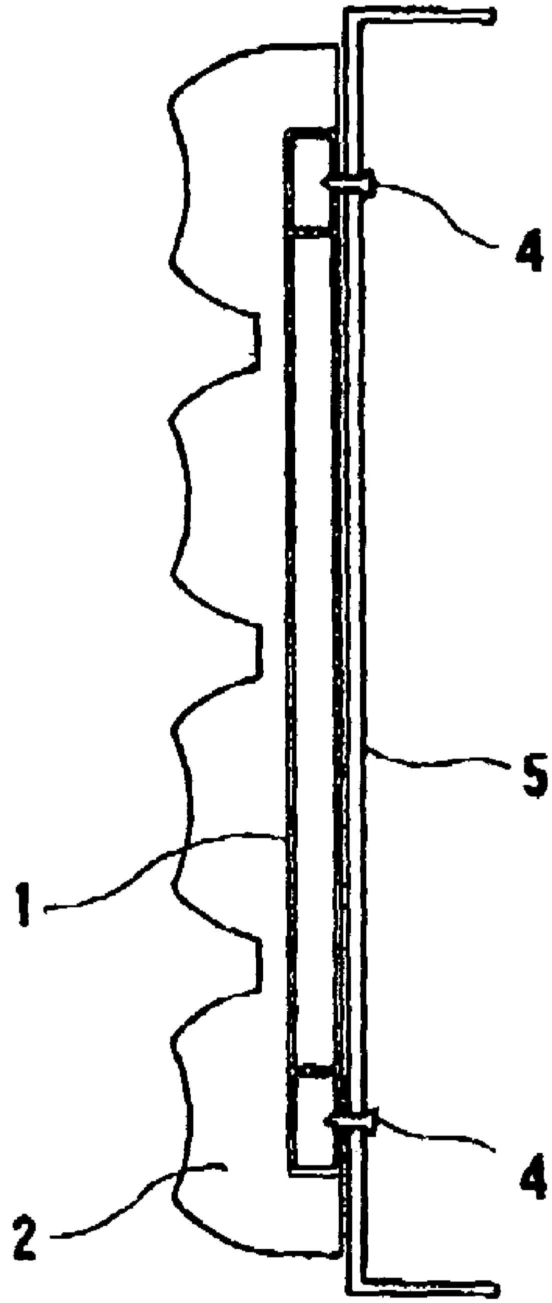
Figure 4:
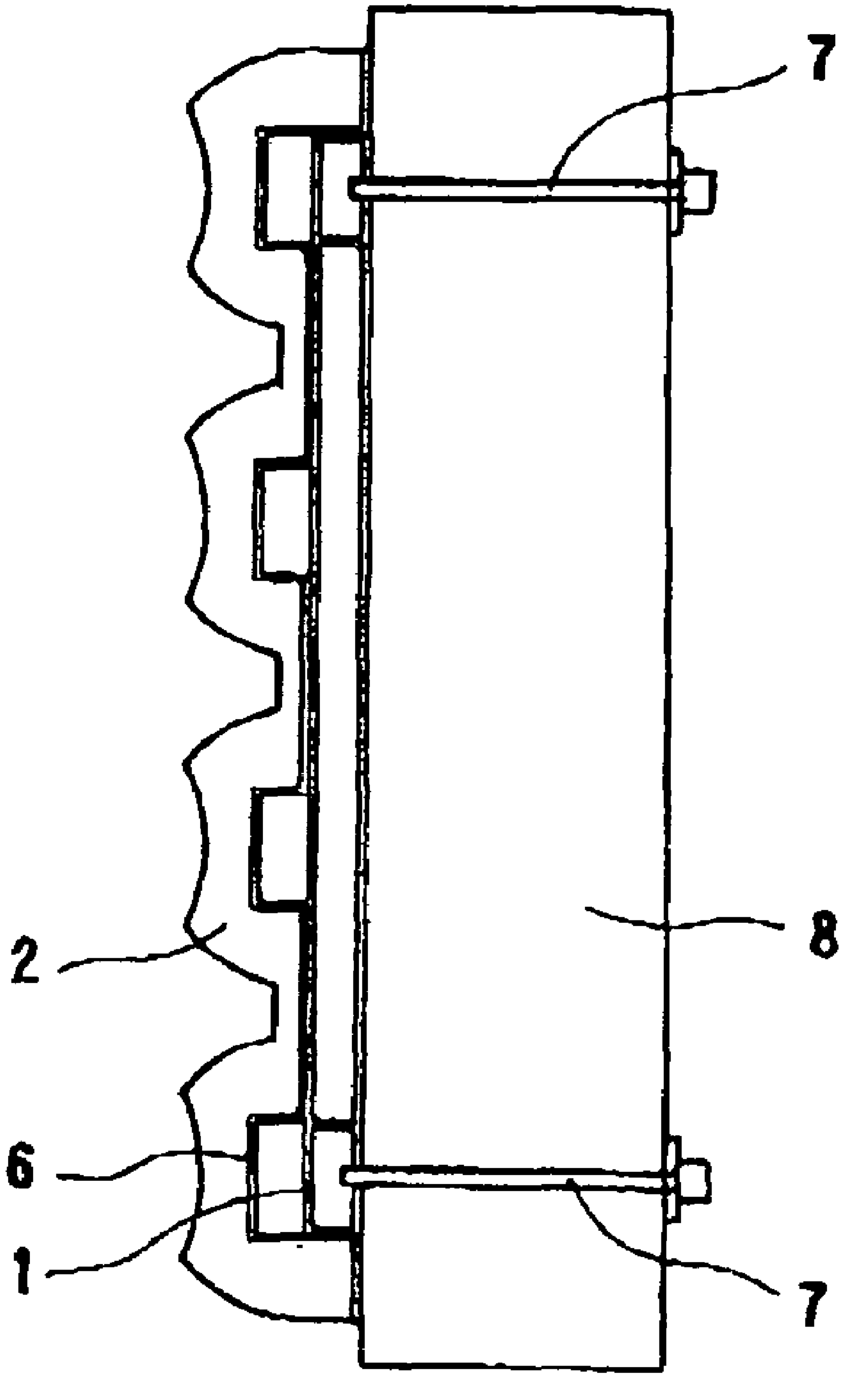
Figure 5:
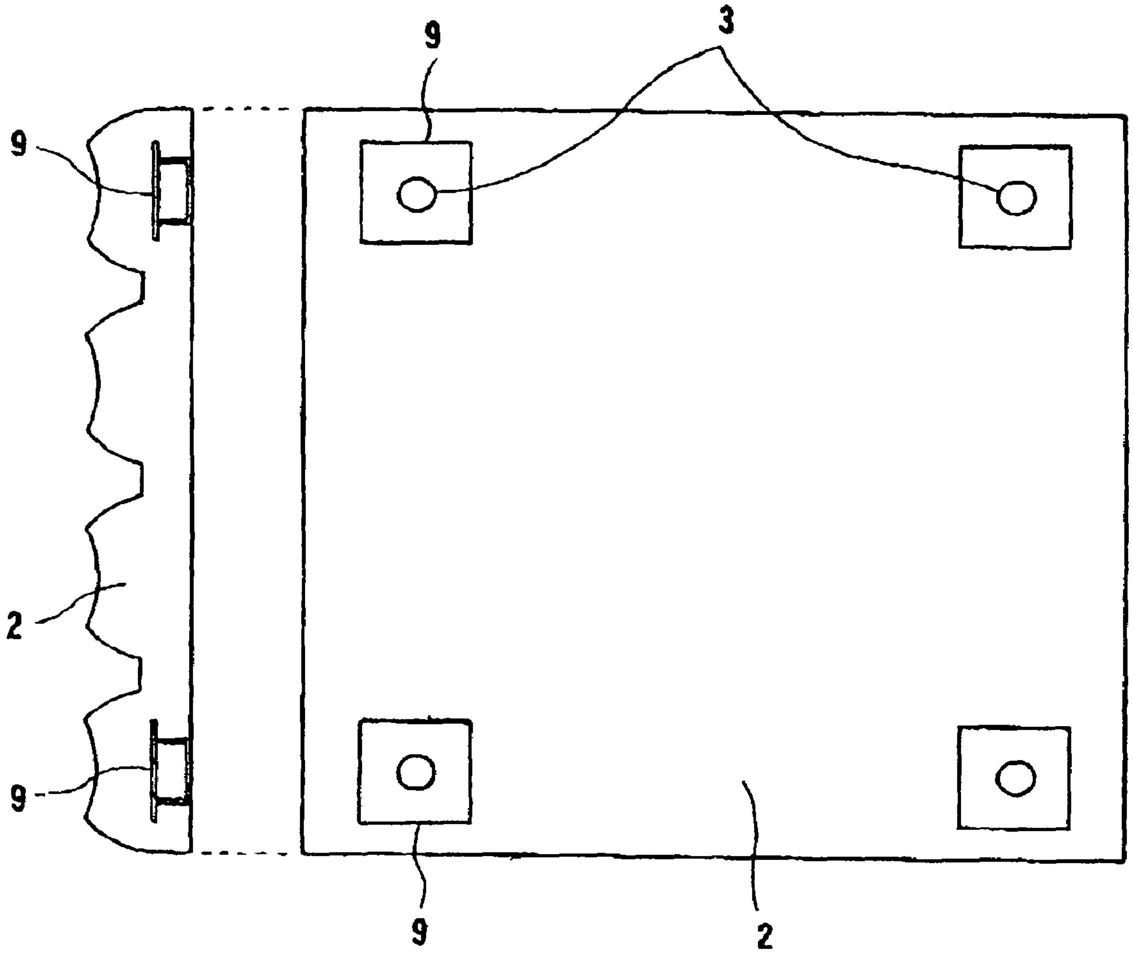
FIGS. 5 and 6 are sectional views and a back surface view showing an example of mold-integrating of steel fittings (partial use).
Figure 6:
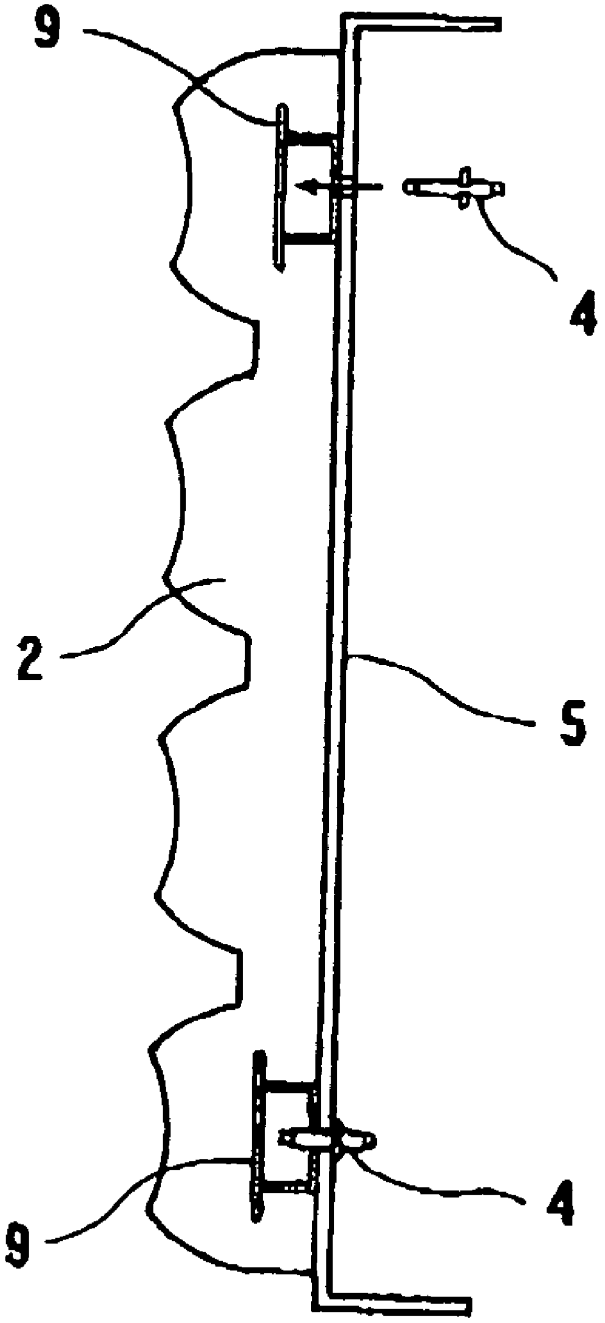

FIGS. 1 to 8 attached hereto show sectional views and plan views of a panel back surface during construction of an artificial stone panel in the invention of this application. FIGS. 1 and 2 (case 1) illustrate an artificial stone panel and a steel frame (1) as a support. The steel frame (1) is combined with artificial stone (2) by integrally molding. The artificial stone panel is installed with steel pillars or studs (5) by rivets (4) or bolts through bolting or riveting holes (3). FIGS. 3 and 4 (case 2) illustrate an artificial stone panel and a support thereof comprising a combination of a steel frame (1) and an irregularly finished steel plate (6). The support is combined with artificial stone (2) by integrally molding. The artificial stone panel is installed with ALC wall (8) by bolts (7) extending through bolting or riveting holes (3). FIGS. 5 and 6 (case 3) illustrate an artificial stone panel and steel fittings (9) as supports thereof. In these cases, steel fittings (9) are molded integrally with the artificial stone wall and installed with steel pillars or studs (5) by rivets (4) or bolts extending through bolting or riveting holes (3).

Figure 7:
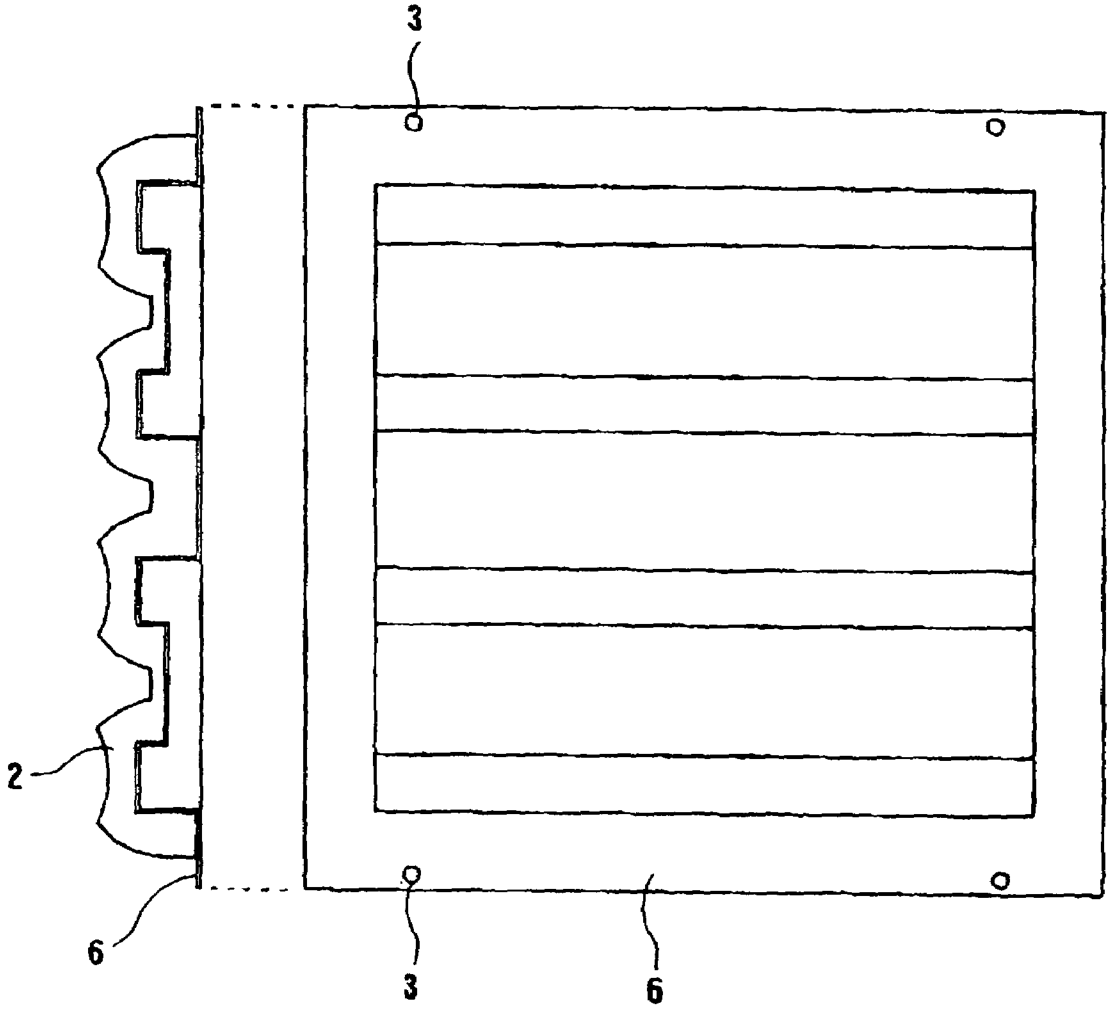
FIGS. 7 and 8 are sectional views and a back surface view showing an example of mold-integrating of an irregularly finished steel plate.
Figure 8:
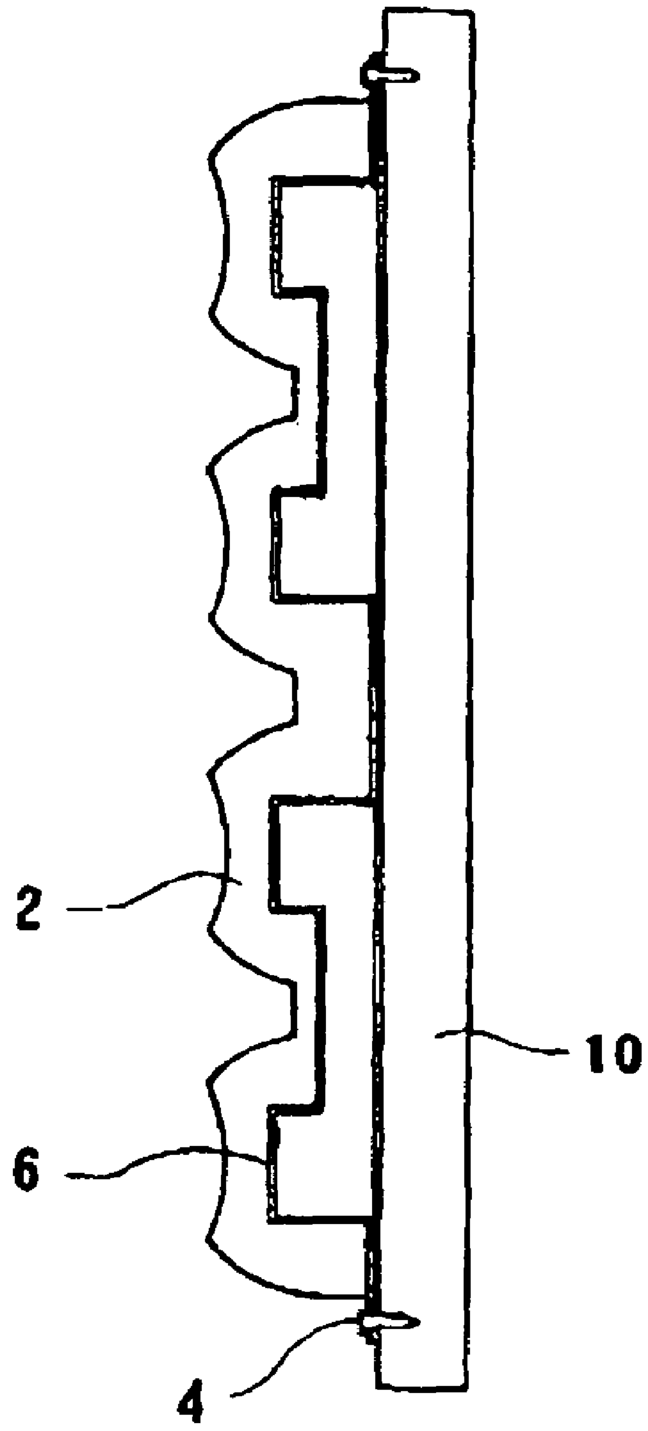

FIGS. 7 and 8 (case 4) illustrate an artificial stone panel and an irregularly finished steel plate (6). In case 2 shown in FIGS. 3 and 4, and case 4 shown in FIGS. 7 and 8, an entire surface is integrally molded with the irregularly finished steel plate (6) to reduce weight and secure an engagement portion while improving a bending strength or a fireproof performance.

As shown in FIGS. 1 to 6 (cases 1 to 3) the engagement portion is rendered hollow for easy screwing or riveting.

Of course, regarding the engagement portion, a number, position, size (for example, a diameter and a length of a screw or a bolt) and a combination are not limited by these examples.

In any of these cases, according to the invention of this application, an artificial stone wall panel having a support embedded therein is realized as an integrally molded product free from warpage or cracks.

According to the invention of this application, for example, the artificial stone panel is actually realized on basis of the following physical properties with large withdrawal destruction load of an embedded fitting portion or a support.

| | |
|---|---|
| Bending strength (JIS A 5209) | 285 N/cm or more |
| Vickers hardness | 1050 |
| Water absorption | 0.1 |
| Accelerated weatherability S.W.O.M (2000 hours) | no abnormality |
| SUV (500 hours) | no abnormality |
| Acid resistance and alkali resistance (JIS A 5209) | no abnormality |
| Freezing and thawing test B method 200 cycles (JIS A 5422 "Ceramics siding") | no abnormality |
| Impact resistance test | no abnormality |

500 g . . . 2000 mm

After dropping weight (plate thickness 18, 21, 24 mm)

Thus, the invention of this application is illustrated more specifically below by referring to the Examples. Of course, the invention is not limited by the following Examples.

EXAMPLES

Example 1

Compositions shown in Table 1 were prepared. In this table, MMA indicates methyl methacrylate resin component, and additives indicate a peroxide-type curing catalyst and a light stabilizer.

For each composition, mold-integration with a support as shown in FIGS. 1 and 2 was performed under a pressure of 12 $N/cm^2$. Artificial stone panels having a total thickness of 23 mm and a height (depth) of 13 mm in asperity (concavo-convex portion) was molded, using a steel frame having a thickness of 6 mm as the support. As a result, as shown in Table 1, a cure shrinkage factor was controlled to less than 0.2% for compositions 1 to 5 referring to the invention of the present application, and high-quality artificial stone panels completely free of warpage and cracks were obtained. Other properties of this wall material, such as a strength, were also good.

Meanwhile, for comparative compositions 1 to 3, warpage and fine cracks were observed, and these were not suitable as a wall panel.

Further, in compositions 1, 2 and 4 containing transparent fine powders, a pleasant design with a hitherto-unknown variable and scattering sparkle was identified.

TABLE 1

| | Blending component (wt. %) | Composition 1 | Composition 2 | Composition 3 | Composition 4 | Composition 5 | Comparative Composition 1 | Comparative composition 2 | Comparative composition 3 |
|---|---|---|---|---|---|---|---|---|---|
| A | Granite-type river sand inorganic fine powder comp. | 23 | 23 | 30 | 42 | 54 | | 32 | 30 |
| B | Andesite-type crushed stone inorganic fine powder comp. | | 20 | 40 | | | 28 | 16 | 40 |
| C | Transparent inorganic fine powder comp. (quartz) | 20 | 20 | | 27 | | | | |
| D | Inorganic finely divided comp. (alumina hydroxide) | 43 | 21 | 14 | 23 | 20 | 56 | 16 | 14 |
| E | MMA | 13 | 15 | 15 | 7 | 25 | 15 | 35 | 15 |
| F | Additives, etc. | 1 | 1 | 1 | 1 | 1 | 1 | 1 | 1 |
| (A + B + C)/D | | 1/1 | 3/1 | 5/1 | 3/1 | 3.7/1 | 1/2 | 3/1 | 5/1 |
| Cure shrinkage factor (%) | | 0.15 | 0.05 | 0.1 | 0.06 | 0.08 | 0.35 | 0.5 | 0.4 |

(Notes)
In compositions 1 to 5 and comparative compositions 1 and 2, the grain size of A, B and C is from 180 μm to 3.35 mm, and the grain size of D is less than 180 μm (average grain size: 70 μm).
In comparative composition 3, the grain size of A, B and C is from 850 μm to 3.35 nm, and the grain size of D is from 180 μm to less than 850 μm.

Example 2

Composition of an artificial stone body was as follows.

| | | |
|---|---|---|
| Resin component | 20% by weight | |
| (details) | methyl methacrylate | 40% |
| | butyl methacrylate | 30% |
| | acrylic resin | 30% |
| Curing agent, etc. | 1% by weight | |
| Inorganic fine powder component | 58% by weight | |
| (180 μm to 5 mm) (details) | transparent natural silica rock | 10% |
| | granite | 90% |
| Inorganic finely divided component Aluminum hydroxide (less than 180 μm, average grain size 70 μm) | 21% by weight | |

An ambient temperature-setting mixture of the foregoing composition was charged into a bottom mold, and a support (total height: 10 mm) in combination with a steel frame (thickness: 6 mm) and an irregularly finished plate (height: 10 mm) as shown in FIGS. 3 and 4, were pressed with a top mold at a pressure of 10 $N/cm^2$ while applying vibration. A resulting product was cured at room temperature for approximately 30 minutes.

After withdrawal from the molds, a mold-integrated artificial stone wall panel (total thickness: 23 mm) with a support embedded thereto was obtained. Neither warpage nor cracks were observed in this panel.

Example 3

Figure 9:
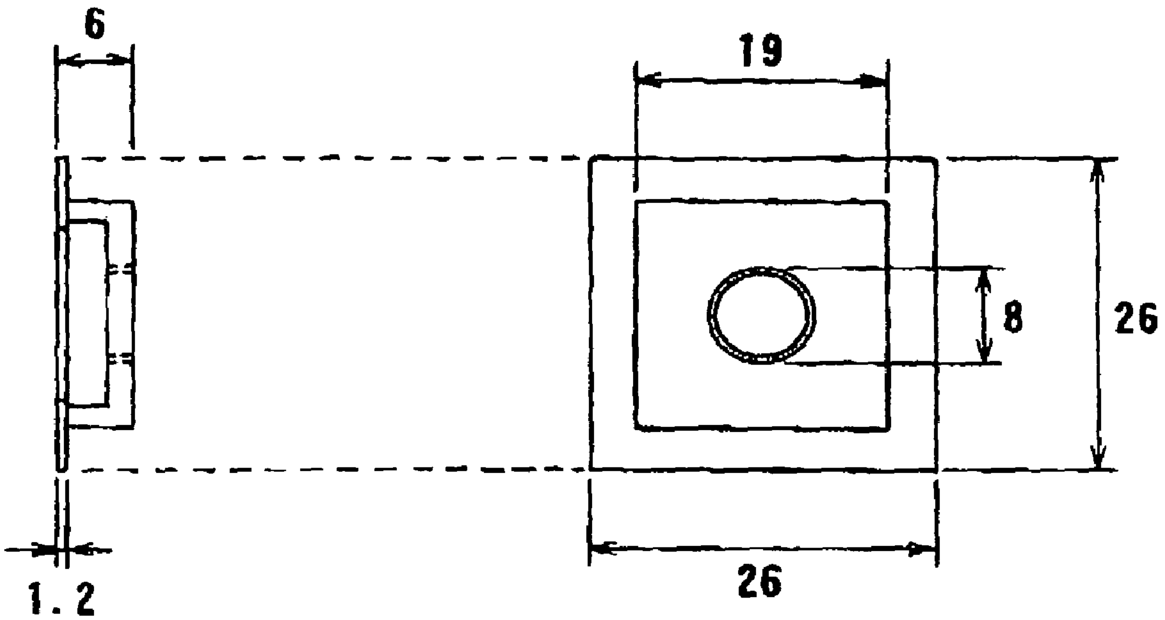
FIGS. 9-12 are sectional views and front views showing supports to be integrally molded and sizes thereof.

An artificial stone wall panel was molded in accordance with Example 2 using the steel fittings shown in FIGS. 5 and 6 (case 3). Here, each steel fitting (FIG. 9) is made of SS41 coated with pentite (Zn). Sizes thereof (mm) are shown in FIG. 9. A total thickness of the artificial stone wall panel was 20 mm. Height (depth) of asperity at a surface of the artificial stone was 10 mm. In this case, a withdrawal destruction load of an embedded steel fitting portion was 420 kgf/fitting.

Figure 10:
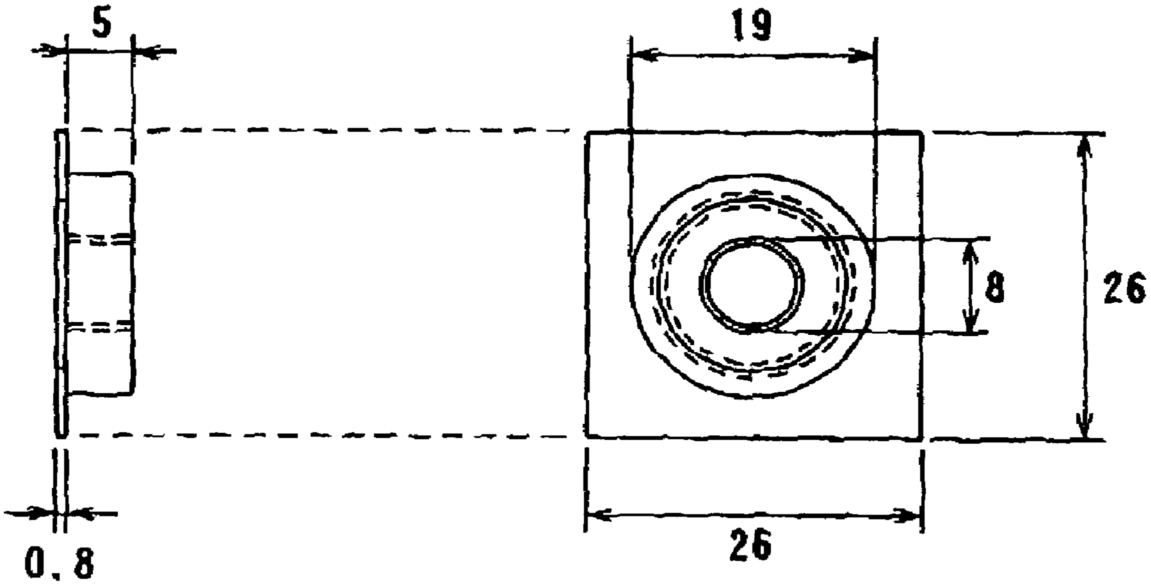
Figure 11:
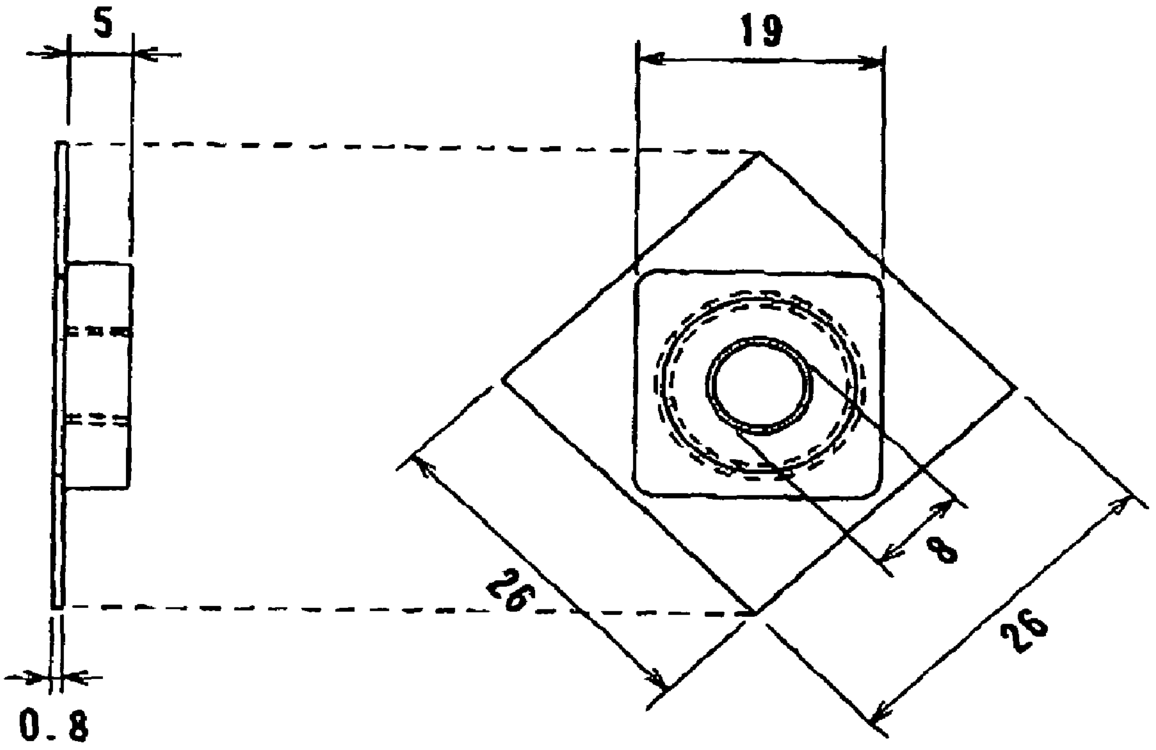
Figure 12:
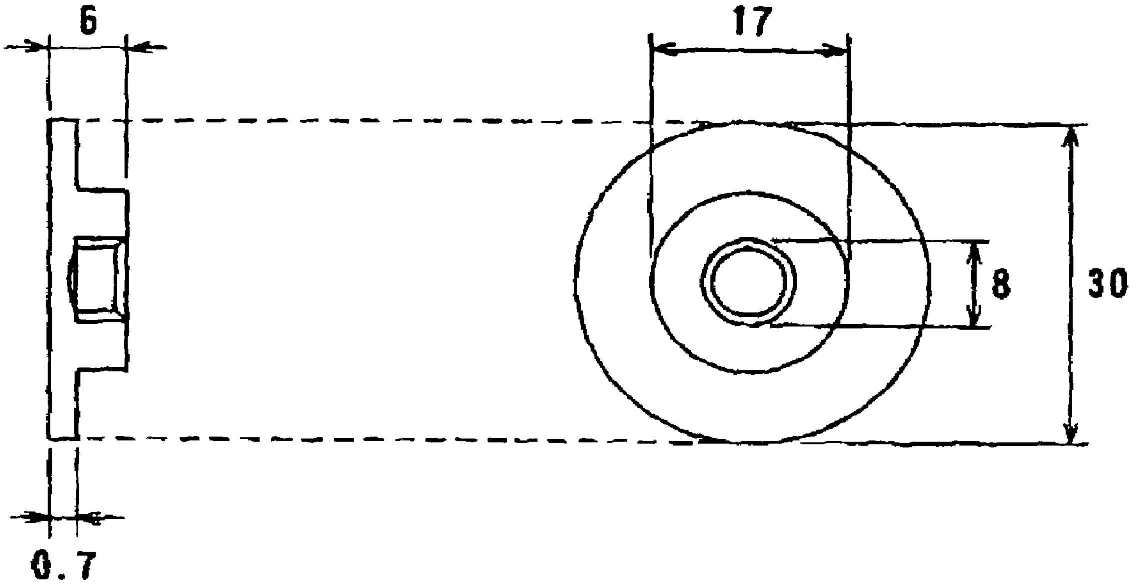

For cases using steel fittings shown in FIGS. 10 to 12 instead of the above mentioned steel fittings, each withdrawal destruction load of each embedded steel fitting was measured as follows;

steel fitting shown in FIG. 10 (SUS 304): 864 kgf
steel fitting shown in FIG. 11 (SUS 304): 1052 kgf
steel fitting shown in FIG. 12 (SUS 304): 733 kgf

INDUSTRIAL APPLICABILITY

As has been described in detail above, the invention of the present application provides, upon solving foregoing problems associated with prior art, a novel artificial stone wall panel as an external wall material with excellent design, while also simplifying installation to an external wall, thereby being advantageous in view of productivity, workability and cost, by mold-integrating an artificial stone and a support for installing such artificial stone to an external wall surface.

The invention claimed is:

1. An artificial stone wall panel comprising:

an artificial stone having a surface exhibiting an asperity having a depth of from 10 mm to 100 mm, said artificial stone having a composition of (i) an inorganic fine powder component having a size of from 9.5 mm to 180 μm, with at least 5% weight of said inorganic fine powder component being a transparent inorganic component, (ii) an inorganic finely divided component having a size of less than 180 μm, and (iii) a resin component in an amount of from 7% to 30% total weight of said composition, with a ratio of weight of said inorganic fine powder component to weight of said inorganic finely divided component being in a range of from 1:1 to 5:1, and with said composition having a cure shrinkage factor of at most 0.3% and a density in a range of from 2.0 $g/cm^3$ to 2.8 $g/cm^3$ after curing; and a support, for installing said artificial stone onto a wall surface, embedded within said artificial stone, said support being embedded at a volume ratio of at most 80% and at a depth of at most 80% of a total thickness of said artificial stone such that part of said support is exposed at a back surface or an edge surface of said artificial stone.

2. The artificial stone wall panel according to claim 1, wherein said support comprises a metal fitting.

3. A process for producing an artificial stone wall panel, comprising:

preparing a mixture having a composition of (i) an inorganic fine powder component having a size of from 9.5 mm to 180 μm, with at least 5% weight of said inorganic fine powder component being a transparent inorganic component, (ii) an inorganic finely divided component having a size of less than 180 μm, and (iii) a resin component in an amount of from 7% to 30% total weight of said composition, with a ratio of weight of said inorganic fine powder component to weight of said inorganic finely divided component being in a range of from 1:1 to 5:1, and with said composition having a cure shrinkage factor of at most 0.3% and a density in a range of from 2.0 $g/cm^3$ to 2.8 $g/cm^3$ after curing;

filling said mixture into a bottom mold; and using a top mold in combination with said bottom mold to press-mold a support with said mixture, under a pressure of from 1 $N/cm^2$ to 100 $N/cm^2$, so as to produce an artificial stone having a surface exhibiting an asperity having a depth of from 10 mm to 100 mm, and also having embedded in at least one of a back surface and header surface of said artificial stone said support, with said support being embedded at a volume ratio of at most 80% and at a depth of at most 80% of a total thickness of said artificial stone such that part of said support is exposed at a back surface or an edge surface of said artificial stone, wherein said support to be used for installing said artificial stone onto a wall surface.

4. The process according to claim 3, wherein said resin component is a mixture of at least two of a monomer, an oligomer, and a polymer.

* * * * *